United States Patent [19]

Vos

[11] Patent Number: 5,102,672

[45] Date of Patent: Apr. 7, 1992

[54] APPARATUS FOR FORMING AN INTERIOR CHOCOLATE LAYER ON AN ICE-CREAM CONE

[76] Inventor: Neale Vos, 1599 Castleton Ave., Staten Island, N.Y. 10302

[21] Appl. No.: 619,069

[22] Filed: Nov. 28, 1990

Related U.S. Application Data

[63] Continuation-in-part of Ser. No. 490,829, Mar. 8, 1990.

[51] Int. Cl.⁵ .................. A21D 15/00; A21D 13/00; A65G 59/00

[52] U.S. Cl. ....................... 426/94; 426/95; 426/138; 426/139; 426/249; 426/279; 426/280; 426/281; 426/283; 426/306; 118/69; 118/101; 118/18; 118/13; 425/138

[58] Field of Search ............. 426/279, 280, 283, 306, 426/139, 249, 281, 94, 95, 138; 118/69, 101, 18, 13; 425/138

[56] References Cited

U.S. PATENT DOCUMENTS

| | | | |
|---|---|---|---|
| 1,136,074 | 4/1915 | White | 426/279 |
| 2,176,409 | 10/1939 | Peterson | 426/279 |
| 3,171,367 | 3/1965 | Carter et al. | 426/306 |
| 3,274,958 | 9/1966 | Otken | 426/279 |
| 4,289,791 | 9/1981 | Weinstein | 426/139 |
| 4,313,965 | 2/1982 | Weinstein | 426/139 |
| 4,390,553 | 6/1983 | Rubenstein | 426/139 |

*Primary Examiner*—Jeanette Hunter
*Attorney, Agent, or Firm*—Milton Gerstein

[57] ABSTRACT

An apparatus for forming a layer of chocolate on the interior surface of an ice-cream having a cone-shaped mold that is interiorly-cooled by ice-water provided thereto from a bucket, or other source, of ice-water. For forming an interior chocolate coating, liquid chocolate is placed into the interior of the cone, and the cone is then placed onto the cold mold, and centered thereon by the upper end portion of the mold. The cone is allowed to remain there for a short while, while the cold mold-surface solidifies the liquid chocolate, to thereby form the interior layer of chocolate. A stripping device may, if desired, be employed for aiding in the removal of the thus-coated cone from the mold. In the preferred embodiment, the mold is secured directly to the ice-bucket.

18 Claims, 5 Drawing Sheets

APPARATUS FOR FORMING AN INTERIOR CHOCOLATE LAYER ON AN ICE-CREAM CONE

CROSS-REFERENCE TO RELATED APPLICATION

The present application is a continuation-in-part of application serial number 07/490,829, filed on Mar. 8, 1990 pending.

BACKGROUND OF THE INVENTION

The present invention is directed to an apparatus by which a layer of chocolate may be coated onto the interior surface of an ice-cream cone. It is known to apply a coating of chocolate to the interior surface of an ice-cream cone, but such has hitherto been done without the aid of any device or apparatus, making it difficult, time-consuming, and haphazard, in that chocolate-coated cones may differ markedly from each other. These drawbacks not only cause poor quality control, but have also made it difficult to provide for the production of such chocolate-coated cones in large quantities, such as would be required at commercial establishments, such as ice-cream shops, parlors, stores, and the like.

The prior art has also consisted of a conically-shaped mold over which an ice-cream cone is laid, which mold is hollow and cooled by refrigerator coils provided in the hollow interior of the mold, so that liquid chocolate spread on the interior of the ice-cream cone may be solidified when the cone is placed over the mold. This type of apparatus requires costly and difficult-to-maintain refrigeration-equipment, and has not been able to consistently and effectively cool the mold in order to solidify the liquid chocolate on the interior surface of the ice-cream cone. Owing to the relatively small size of the mold necessary for receiving a cone thereover, effective cooling of the mold via refrigeration and the tubing associated therewith has not proven practicable nor effective.

SUMMARY OF THE INVENTION

It is the primary objective of the present invention to provide an apparatus for coating the interior surfaces of ice-cream cones.

It is another objective of the present invention to provide such an apparatus for coating the interior surfaces of ice-cream cones, such that the coated-cones will be similar, and have a more-even layer of chocolate applied, in a more consistent manner, thereby greatly enhancing quality control.

It is yet another objective of the invention to provide such an apparatus for coating the interior surfaces of ice-cream cones, which is relatively easy to use, and which prevents the liquid chocolate used in the coating process from dripping or escaping outside of the cone during the chocolate-coating process.

It is yet another objective of the invention to provide such an apparatus for coating the interior surfaces of ice-cream cones, which forms the layer or coating of chocolate in a fast manner.

It is still another objective to provide such an apparatus that also pumps hot water to the mold after the chocolate layer has been formed in the cone via the cold water, in order to aid in the removal of the thus-formed chocolate cone from the mold proper.

Toward these and other ends, the apparatus for coating the interior surfaces of ice-cream cones comprises a cone-shaped mold that is interiorly-cooled by ice-water provided thereto from a bucket, or other source, of ice-water. The cone-shaped mold has approximately the same sloping surface as that of the cones which are to be coated with chocolate, but has a cross-sectional diameter less than that of the ice-cream cones except for its uppermost end portion, whereby the annular space between the interior surface of the cone and the exterior surface of the mold provides a volume in which the chocolate coating is provided and formed. The uppermost end portion of the mold has the same slope as the remainder of the mold-surface, but of cross-sectional diameter approximately matching that of the upper interior end portion of the ice-cream cone, whereby the ice-cream cone is held on the mold, centered on the uppermost end region of the mold, and whereby the liquid chocolate is prevented from escaping.

For forming an interior chocolate coating, liquid chocolate from a double-boiler is placed into the interior of the cone, in just the right, measured amount for that size of cone, so that when the final solid coating is formed, it will be evenly distributed over the cone interior. After the liquid chocolate is measured and poured into the interior of the cone, the cone is then placed onto the cold mold, and centered thereon by the upper end portion of the mold, and also partially retained thereby. The cone is pushed up the mold by one's hand until the top larger-portion thereof reaches the sloped upper end portion of the cone. The cone is allowed to remain there for a short while, while the cold mold-surface solidifies the liquid chocolate, to thereby form the interior layer of chocolate. A stripping device may, if desired, be employed for aiding in the removal of the thus-coated cone from the mold. In the preferred embodiment, the mold is secured directly to the ice-bucket.

In a modified version, there is also provided a second, hot water bucket with associated pump and tubing, and a lever control-arm that controls the operation of each of the cold water and hot water pumps, so that, after the cold water has caused the chocolate-layer to become solidified, the hot water will warm the mold just enough to allow for easy removal of the cone without the chocolate sticking to the mold proper.

BRIEF DESCRIPTION OF THE DRAWINGS

The invention will be more readily understood with reference to the accompanying drawings, wherein.

DETAILED DESCRIPTION OF THE INVENTION

Referring now to the drawings in greater detail, the apparatus for forming an interior layer of chocolate of an ice-cream cone is indicated generally by reference numeral 10. The apparatus 10 includes a bucket 12 filled with ice-water, which ice-water is used for cooling an aluminum mold 14, which mold 14 is used for cooling and solidifying measured melted chocolate poured into the interior surface of an ice-cream, when the ice-cream cone is placed over the mold. The mold 14 has the same general shape as an ice-cream cone, i.e., substantially conical or frustro-conical in shape. The size and dimensions of the conically-shaped mold 14 will depend upon the size and dimensions of the ice-cream cones to be treated. It is, however, within the scope and purview of the invention to allow for the mold to accommodate various sizes of cones, as will be explained, infra. The mold defines an outer tapered surface that is "TEFLON" coated, or the like, to allow for easy removal of the cone after treatment, which outer surface has a slope or taper substantially equal to the interior taper of an ice-cream cone to be treated. Most of the length of the mold, however, has a cross-sectional diameter less than the corresponding diameter-section of the cone placed thereover, so as to leave an annular volumetric space 16 between the outer surface of the mold and the interior surface of the cone, in which space 16 is to be formed the solidified layer of chocolate-coating. The upper end-portion 14' of the mold 14 is provided with a larger-diameter cross section 20, which defines an outer tapered surface also of the same slope as that of the conical ice-cream cone and the same as the rest of the outer surface of the mold. This tapered section 20 defines at least along one diametric portion thereof having a cross-sectional diameter approximately equal to the cross-sectional diameter of the upper interior portion of the ice-cream cone, so that the ice-cream cone may be held on this tapered section 20, while also being centered thereby, so that the annular volumetric space 16 has the same width, as defined between the outer surface of the mold and the inner surface of the cone, all around it, so that the layer of chocolate coating is as uniformly as possible distributed about the interior surface of the cone, given the imperfect shape of the cone and the viscosity of the melted chocolate. The length of the centering strip as measured from top to bottom, may be between ⅛ inch and ¼ inch, so that approximately the same length of the upper interior portion of a cone is in surface-to-surface contact therewith, for holding and centering the cone, as explained, supra. This centering section 20 also serves to prevent the melted chocolate from rising out of the interior of the cone and spilling outwardly therefrom. There is a transitional connecting surface 16' between the upper, centering section 20 and the remainder of the outer surface of the mold.

The use of the tapered centering section 20, as explained, provides for a more uniform chocolate coating, by centering the cone. It is, however, within the scope and purview of the invention, to provide a conically-shaped mold that has a length or height from top to bottom that will accommodate the longest of ice-cream cones to be treated, while also being able to treat smaller cones, owing to the conical taper thereof. For smaller cones, the bottom apex will limit the telescoping mounting of the cone about lower portions of the mold, if the smaller cone has a taper greater than that of the mold's outer surface. Otherwise, the small cone's movement over the mold's outer surface will be limited by the cross section of the mold having the same diametric extent as the upper end of the ice-cream cone. The centering strip 20 may be still provided for use with the largest cone to be treated, with the smaller cones not having as uniform a chocolate-coating, absent the centering function of a centering annular strip. In the case of a small cone having a taper greater than that of the mold, where the bottom apex thereof limits its telescoping movement, less than the full measured amount of melted chocolate may have to be used in order to prevent the outward spillage from the interior of the cone during treatment.

Figure 1:
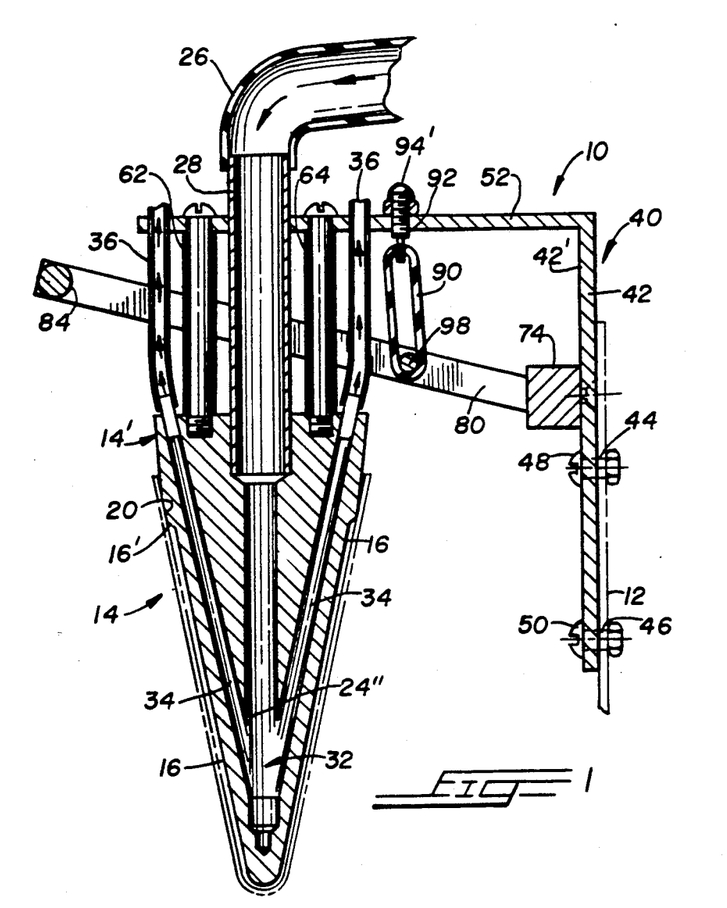
FIG. 1 is a vertical cross-sectional view of the APPARATUS FOR FORMING AN INTERIOR CHOCOLATE LAYER ON AN ICE-CREAM CONE of the invention.
Figure 2:
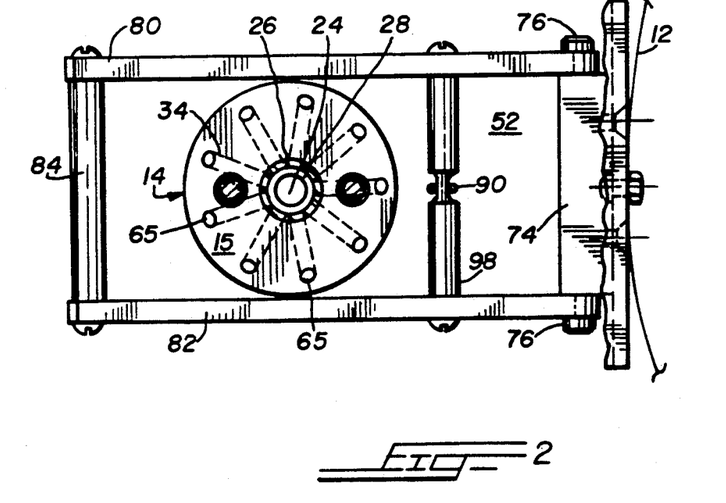
FIG. 2 is a top view thereof.

As explained above, the mold is brought to a cold temperature in order to solidify the melted chocolate placed in the interior of the ice-cream cone. The melted chocolate is supplied from a double-boiler, and poured into the interior of an ice-cream cone by means of a measuring scoop, which scoop provides the same amount to each similar-sized cone, and which measured amount is that which allows for coating on the entire interior surface of the cone, without excess, so as to prevent spillage and an uneven coating. The mold is preferably held at a temperature close to 32 degrees F., and is achieved by pumping ice-water from the ice-bucket 12 through the interior of the mold 14 and out again for return back to the ice-bucket for re-cooling. The mold 14 is provided with a ¼ inch, vertical central passageway 24 extending most of the length, or depth, of the mold 14, which central passageway receives a supply of pumped ice-water from the ice-bucket 12 via a ½ inner diameter rubber tube or conduit 26. An aluminum connecting cylindrical pipe or tube 28, preferably ½ inch in outer diameter, has an upper end for telescopingly mounting the end of the supply conduit 26, the lower end of the tube 28 being received in an enlarged upper portion 24' (FIG. 3) of the central passageway 24 for nestled seating therein, which nestled seating is provided by the truncated-conical shape of the bottom of the upper opening 24', as clearly shown in FIG. 1. The length, or depth, of the upper opening 24' is such as to prevent the tube 28 from tipping over. In fluid communication with the bottom 24" is a manifold portion 32, formed at the lower or bottom apex of the mold 14, with which nine smaller vertically-sloping return-passageways 34 are in fluid communication, so that the supply-water through the central passageway 24 may be returned to the ice bucket via these nine return-passageways 34, by nine rubber return-tubes 36 of ⅛ inch inner diameter. The nine return-passageways 34 are arranged concentrically about the central passageway 24, as seen in FIG. 2, where the upper ends of these return-passageways form a circle about the central opening. Each return-passageway 34 has a lower end sloping inwardly from its upper end, and ending in the lower manifold portion 32. The distal ends of the nine rubber return-tubes 36 are placed in the ice-bucket so that the water may be returned to the ice-bucket for re-cooling, where the same water is recycled. The return-passageways 34 are placed as close as possible to the outer surface of the mold 14, so as to provide the most effective cooling thereof. The manifold portion 32 is of such depth so as to allow for the proper circulation and flow of the water-supply, in order to provide sufficient cooling action.

In the preferred embodiment, the mold 14 is secured directly to the outer wall of the ice-bucket, via an L- shaped bracket 40. The bracket 40 has a first, vertical, flat-plate leg-portion 42 defining a pair of vertically-aligned holes 44, 46, by which screws 48, 50 may secure the bracket 40 to the ice-bucket, and a second, flat-plate horizontal leg-portion 52 for directly mounting the mold thereto. The upper, horizontal leg-portion 52 has a pair of holes 54, 56 by which the mold is secured thereto by elongated screws 58, 60, telescopingly received in a pair of steel spacers 62, 64. The threaded tip-ends of the two screws 58, 60 are received in a pair of threaded holes 66, 68 formed in the upper surface 15 of the mold 14, with the mold proper being spaced vertically downwardly from the upper horizontal leg portion 52 of the bracket 40 by the spacer-sleeves 62, 64, so as to provide a gap or space between the leg-portion 52 and the upper surface 15 of the mold, in which space is pivotal a stripper-member 70 for aiding in the removal of the coated cone from its contact with the mold surface, after the chocolate layer-coating has been solidified. In a version of the invention where no stripper-member 70 is provided, then the spacer-sleeves 62, 64 would not be needed, and the upper surface 15 of the mold 14 may directly abut, or be in close proximity to the undersurface of the upper leg-portion 52. In either version, this upper leg-portion is provided with an enlarged circular opening 72 through which passes the upper part of the aluminum feed-pipe 28, for subsequent coupling to the rubber feed-conduit 26, and is also provided with a circular array of nine arcuately-spaced smaller circular holes 65 through which pass respective ones of the nine rubber return-tubes 36 for subsequent placement of their distal ends in the ice-bucket. It is, of course, to be understood that the number of such return-tubes 36, and associated return-passageways 34 may vary depending the diametric size thereof, size of the mold, temperature of the water, and the like.

Figures 3, 4:
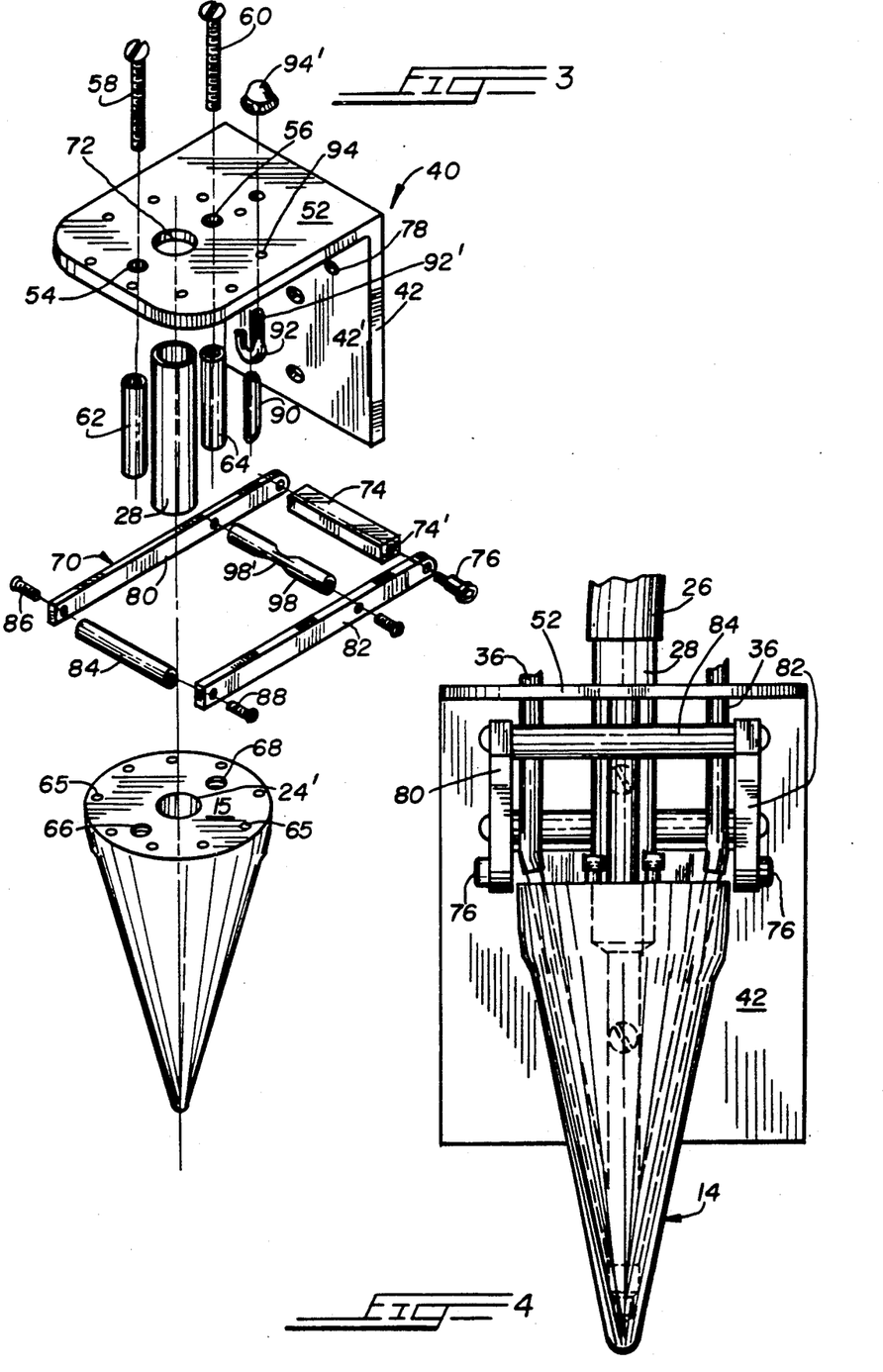
FIG. 3 is an assembly view thereof.
FIG. 4 is a front view thereof.

The stripper member 70 is pivotally mounted at one end thereof to the mold-facing surface 42' of the first leg-portion 42 by a pivot-block 74 having a transverse axial opening 74', best seen in FIG. 3, for receiving two pivot shaft pins 76 at each end thereof, for rotatably mounting the stripper element's side frame bars 80, 82 for rotation about the pivot block, as clearly shown in FIG. 3, for rotation in a vertical direction. The pivot block 74 may be secured to the interior face 42' by threaded holes 78 and screws passing therethrough and into the block proper. The pair of side frame bars 80, 82 have holes at the inner ends for passing therethrough the pivot pins for rotation thereabout. The perpendicular distance between the interior, mutually-facing surfaces of the two side frame bar members 80, 82 is slightly greater than the circular diameter of the upper portion of the mold, so that as the stripper element is rotated downwardly, the bottom surfaces of the two side frame bars may clear the upper centering strip 20, and push the upper edge surface of the ice-cream cone off the centering strip and thereby cause the chocolate-coated cone off the mold. The stripper element may not be needed in an embodiment where the "TEFLON" coating provides a smooth enough surface where there is no worry of the cone sticking to the mold surface. Such a coating may be Endura 1043 infused matrix. This distance between the two side frame bars also, of course, allows clearance of the return tubes 36, when the stripper element is pivoted vertically. The lengths of the side frame bars 80, 82 are also enough so as to clear the upper portion of the mold, the exterior or distal ends of which side bar elements are interconnected by a handle-element 84, by screws 86, 88, so as to provide a handle by which a person may manually rotate the stripper element. The stripper element is biassed in the upward direction by a rubber band 90, or the like, one end-loop of which is constrained by a hook-element 92 having a threaded shaft 92' passing through a hole 94 formed in the horizontal leg portion 52, and secured by a nut 94'. The lower end-loop of the rubber band 90 is wrapped about an intermediate shaft 98 spanning the distance between the two side frame bar elements 80, 82, which shaft 98 has a central dimple or reduced-diameter section 98' at which section the lower end-loop is actually encircled, to help prevent its slippage or sliding along the shaft 98. In using the stripper element, one merely rotates it downwardly against the force of the rubber band, until it contacts the upper edge surface of the cone, with continued downward movement thereof causing the cone to slide off the mold. Releasing the handle 84 thereof causes the stripper element to return, via the rubber band, to its neutral position above the mold.

Figure 5:
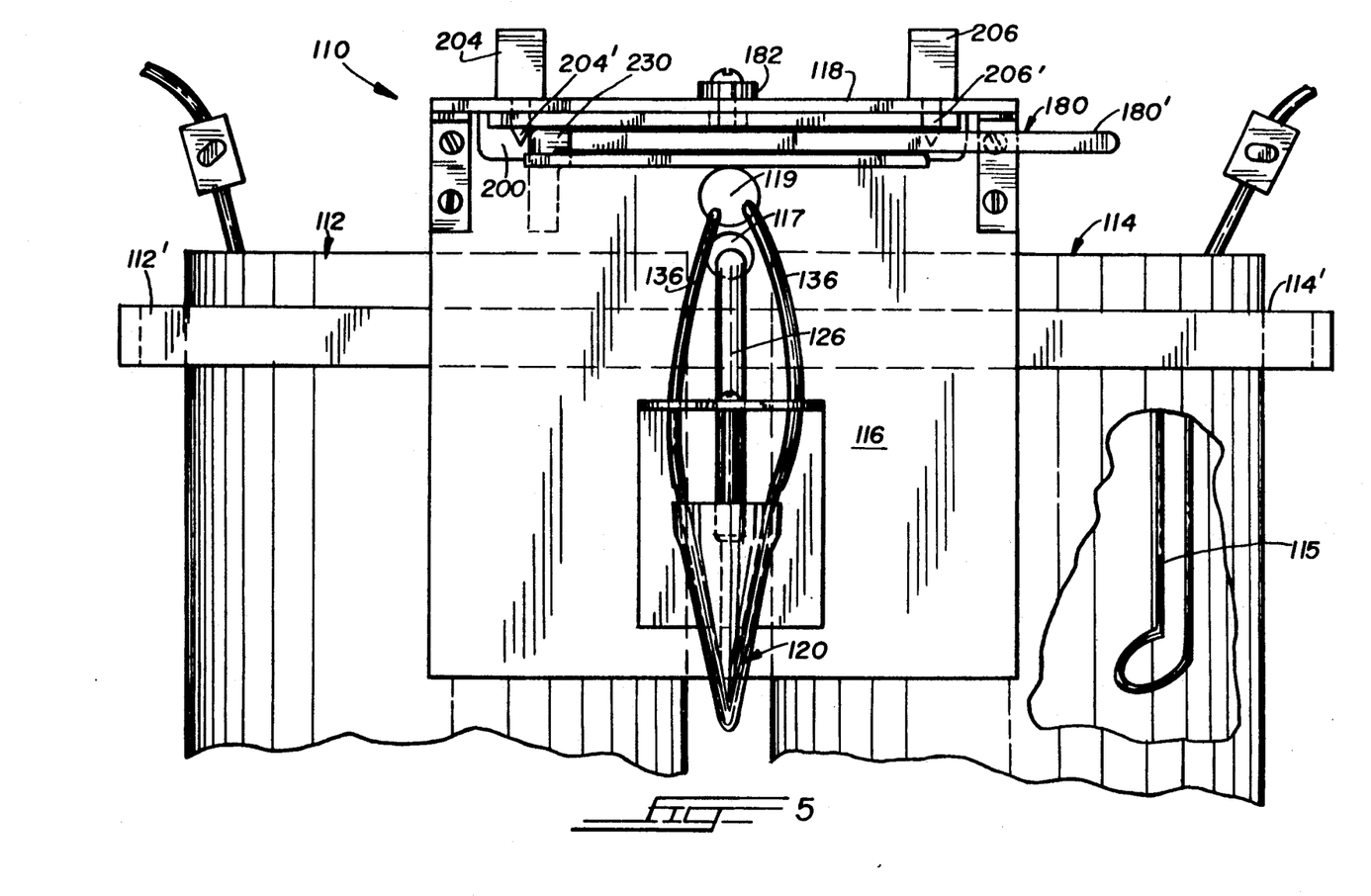
FIG. 5 is a front elevational view of a modified form of the invention incorporating a second bucket of water hot water for heating the mold in order to aid in the removal of the chocolate-coated cone.
Figure 6:
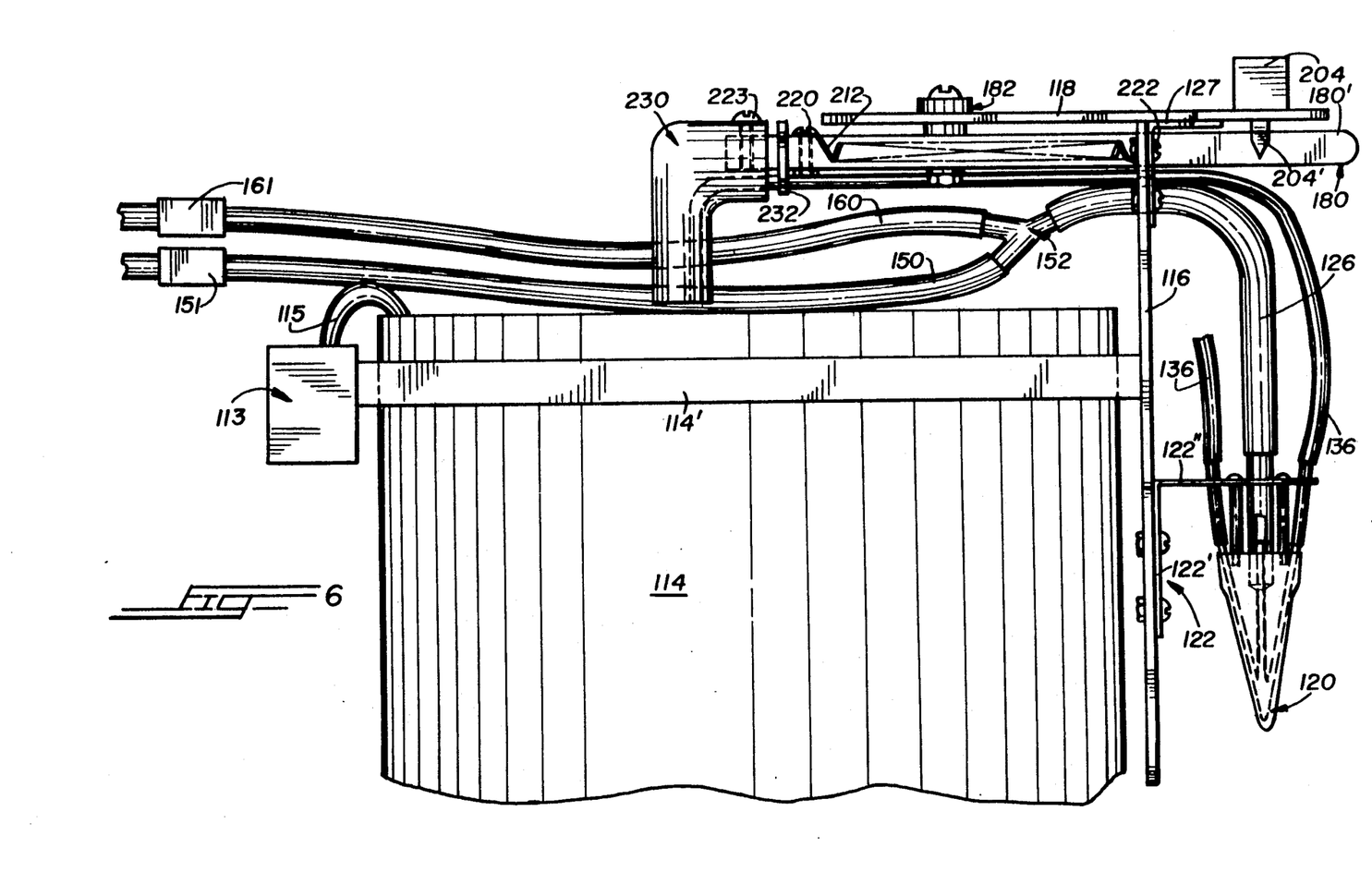
FIG. 6 is a side elevational view thereof.

Referring now to FIGS. 5-8, there is shown a modified form of the invention in which there is used a second, hot water bucket for warming the mold after the chocolate layer has been solidified by the cold water from the cold water bucket, in order to allow easy removal of the thus-formed chocolate-coated cone from the mold without the chocolate sticking to the aluminum mold itself. The apparatus 110 has a cold-water bucket 112 and a hot-water bucket 114 mounted in a side-by-side relationship, which hot water bucket holds water heated to approximately 115 degrees F. Vertical frame member 116 mounts these buckets 112, 114 from the rear surface thereof, as seen in FIG. 6, via peripherally-mounted circular brackets 114', 116'. A heater 113 heats the water in the bucket 114, which heater has heating coils 115 projecting into the bucket to heat the water therein. The upper part of the vertical frame member is connected to a horizontal frame member 118 via brackets 127. The two buckets are spaced laterally apart a short distance as seen in FIG. 5. The vertical frame, or wall, 116 also mounts, on its forward or front surface, the mold 120, which is identical to the mold of FIG. 1. An L-shaped bracket 122 seen in FIG. 6 mounts the mold to the front surface of the vertical wall 116 via its vertical leg portion 122', with the horizontal leg portion 122" directly mounting the mold 120. The bracket 122 is similar to the corresponding structure of FIG. The bracket 122 mounts the mold 120 laterally between the two buckets 112, 114 as seen in FIG. 5, it being understood that the mold projects forwardly from the front surface of the vertical frame 116, while the buckets project rearwardly from the rear surface thereof, as explained above. Projecting into the center of the mold 120 is a water-feed pipe or tube 126 similar to the tube 26 of FIG. 1, which projects through a hole 117 formed in the vertical wall 116, above the mold and bracket-mount therefor, which hole 117 is also elevated above the upper lips of the buckets 112, 114, as seen in FIG. 6. The tube 126 not only feeds cold water for cooling the mold in order to solidify the chocolate coating, but also feeds hot water from the hot water bucket after the chocolate has been solidified, in order to allow easy removal of the finished cone from the mold, so that no sticking of the chocolate occurs. Return pipes 136 are also provided, which are similar to the tubes 36 of FIG. 1, which return-tubes 136 not only return the cold water to the cold water bucket, but also return the hot water to the hot water bucket. These return-tubes pass through a hole 119 formed in the vertical wall 116, which hole 119 is above the hole 117, so that the feed tube 126 does not interfere with the return tubing 136, as seen in FIGS. 5 and 6.

Figures 7, 8:
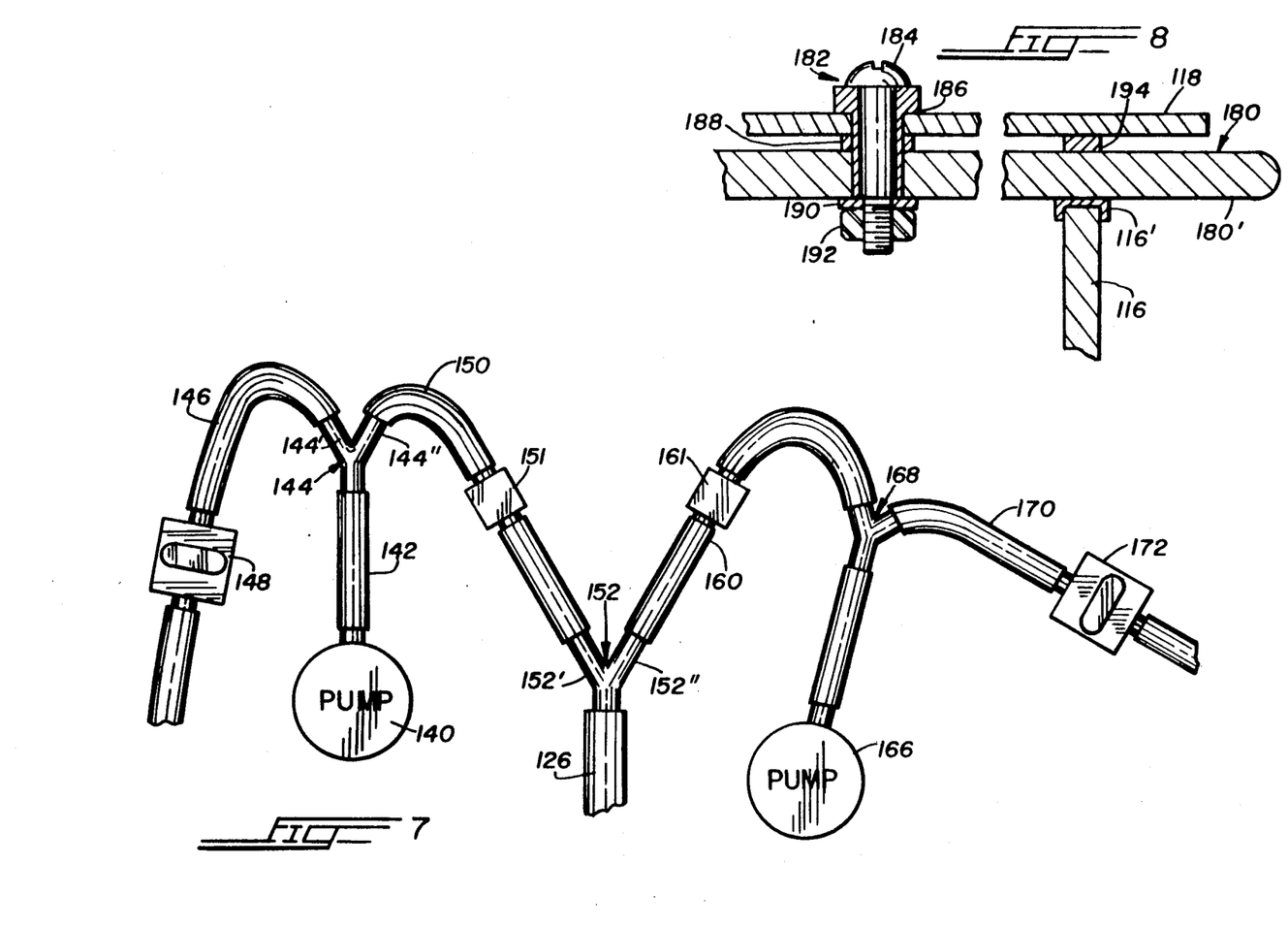
FIG. 7 is a schematic showing the tubing and valves from the hot water and cold water buckets.
FIG. 8 is a detail, cross-sectional view showing the lever control-arm for controlling the operations of the hot and cold water bucket pumps.

The hydraulic arrangement for achieving this change over from the cold water bucket to the hot water bucket, and vice versa, is shown in FIG. 7. A pump 140 for the hot water bucket pumps the water therefrom to a vertical tubular line 142, which connects to a Y-tube connection 144 having a first branch 144' connected to a drain tubing 146 for draining the bucket for cleaning purposes, or the like. A shut-off valve 148 allows for such draining. The second leg 144" connects to a secondary feed pipe or tubing 150 having a check valve 151 therein which prevents rear flow, in order to prevent cold water from entering the hot water bucket. The tubing 150 connects to another Y-tube connection 152 which connects directly to the main feed tubing 126, as seen in FIG. 6. The Y-tube connector 152 has a first leg 152' for the tubing 150 and a second leg 152" for a supply tubing 160 forming part of the water-supply delivery tubing of the cold-water supply. The water-supply delivery structure of the cold-water supply is identical to that of the hot water supply above-described, and includes a check valve 161 similar to check valve 151, a pump 166 for pumping the cold water from the cold-water bucket, a Y-tube connector 168, a drain pipe 170 and shut-off valve 172. Each pump 140, 146 may be a submersible pump or an external one, and in the preferred embodiment has a capacity of 1/125 horsepower, with each bucket 112, 114 having a volume of five gallons. The water-supply tubing 146, 150, 160, 170 is preferably reinforced vinyl tubing having a ½ inch inner diameter and a ¾ inch outer diameter.

As explained above, first the cold water is pumped through the mold via the pump 166 in order to solidify the chocolate on the inside of the cone. After such solidification has been achieved, the cold-water pump 166 is shut off, and the hot-water pump 140 activated to pump the hot water through the mold, in order to release the chocolate from its sticking to the outer surface of the mold. To accomplish this alternative switching from pump to pump, there is provided a lever-control arm 180 that is pivotally mounted to the upper, horizontal plate 118 via pivot mount 182, which pivot mount is mounted to the horizontal plate rearwardly of the vertical plate 116. The pivot mount 182 is best seen in FIG. 8, and includes a screw 184, and a pivot bushing 186 and nylatron bushing 188 sandwiching therebetween the horizontal plate 118, and also has a washer 190 and nut 192 for securing the screw to the lever control-arm 180. The lever arm 180 has a first, forward end portion 180' that projects through a horizontal slot 200 formed in the upper portion of the vertical plate 116 above the hole 119, which forward end portion provides the portion of the lever accessible to the hand for rotating the lever arm through its approximate 60-degree arc of rotation between extremities. This slot has an upper acetal stiffener 194 and lower nylatron surface 116' to provide easier pivotal movement of the lever arm and increase structural integrity. The upper, horizontal plate 118 mounts a pair of spaced-apart, off-on toggle switches 204, 206 having downwardly--projecting toggles 204', 206', which respectively control the actuation of the pumps 140 and 166, i.e., the switch 204 controls the hot-water pump and the switch 206 controls the cold water pump. When the lever arm 180 is rotated to its right-most extremity when viewing FIG. 5, the toggle switch 206 activates the cold water pump to pump cold water through the mold. When the lever arm is rotated to its left-most extremity, the switch 204 activates the hot water pump. A biassing spring 212 seen in FIG. 6 biasses the lever arm 180 into its right-most position into contact with the toggle switch 206 in order to normally activate the cold water pump. The extension spring 212 preferably has a coil length of 2.904 inches and an outer diameter of ½ inch, with a steel-wire diameter of 0.041 inch, where the control lever arm 180 has a length of 18.5 inches and is a ⅜ inch diameter rod. Manual rotation of the lever arm against the spring brings the forward end portion 180' to its left-most extremity to close the switch 204, to thereby activate the hot water pump. The spring 212 has a first rear end secured to the second rear end portion control lever arm via a screw 220, while the forward end of the spring is secured directly to the rear upper portion of the vertical plate 116 via a screw 222.

The rear end of the control lever arm 180 mounts, via a screw 223, a 90-degree elbow 230 having a hollow interior, which elbow passes therethrough all of the return-passageways 136 from the mold. As can be seen in FIG. 6, all of the return-passageway tubes 136 extend upwardly from the mold, through the hole 119, and rearwardly of the vertical plate 116 directly under the lower surface of the control lever arm 118. A strap 232 secures the ends of the return-passageway tubes 136 to a rear end portion of the control lever arm, which tubes then pass directly into the elbow 230. As explained above, the switch 204 controls the hot water pump while the switch 206 controls the cold water pump, with each switch being positioned on the same lateral side, and elevated above, the bucket whose pump it does not control. The reason for this type of relationship is in order to position the return-passageway tubes 136 over the bucket that is being used, so that when hot water is being pumped it returns to the hot water bucket, and similarly for the cold water. Since the control lever arm not only has the function of activating the respective switch for the pump needed, but also simultaneously positions the return-passageway tubes over that bucket being used, there is required the reverse-relationship above-described with regards to the positioning of the toggle switches adjacent the opposite bucket.

In using the apparatus of FIGS. 5-8, after the cone with melted chocolate has been placed on the mold, cold water is pumped through the mold owing to the normally-biassed contact of the forward end portion of the control lever arm 180 with the cold-water toggle switch 206. As long as the operator does nothing, cold water will be pumped through the mold. Typically, a cone is left on the mold from 20-30 seconds in order to achieve the solidification of the chocolate layer. After the operator assumes that the chocolate layer has been formed and solidified, he then rotates the control lever arm 60 degrees to the left when viewing FIG. 5, which first shuts off the cold water pump and then activates the hot water pump. The ¼ inch inner diameter return-passageway tubes 136 are also simultaneously moved from over the cold water bucket 112 to over the hot water bucket 114 via the elbow 230, so that the hot water returns to its source after having been circulated through the mold. The hot water pump is run from about 3-6 seconds to heat the mold just enough so as to allow for easier removal of the cone from the mold. After the cone is removed, or even right before, the operator releases the control lever arm 180, whereupon it returns via spring 212 to its normal contact against the cold water toggle switch 206, as seen in FIG. 5, which, also, simultaneously moves the return-passageway tubes 136 back over the cold water bucket 112 to return the cold water being circulated through the mold back to its source. It is noted, however, that for the short time interval after each of the pumps has been activated after having been deactivated, the pump will pump, for a short time duration, water from the opposite bucket. That is, after the control lever arm 180 has been moved away from the hot water toggle switch 204, thereby deactuating the hot water pump, the water in the mold at that time is still hot water from the hot water bucket. If, then, the cold water pump were to be actuated, it would return the hot water in the mold to the cold water bucket. Therefore, in using the apparatus, the operator, after having deactivated the hot water switch 204, will hold the control lever arm 180 just slightly spaced from the toggle switch 204 so that the elbow 230 is still positioned over the hot water bucket. The operator will then manually press the cold water toggle switch 206 to actuate the cold water pump, which will then pump the hot water still in the mold back into the hot water bucket. This manual activating of the switch will last for about 3 seconds, which is the time required to return the hot water to the hot water bucket. Then the operator will allow the off-on switch 206 to become on by removing his hand therefrom and will release the control lever arm 180 in order to allow the lever arm 180 to return via the spring bias of spring 212 into engagement with the cold water switch 206, to thereby actuate the cold water pump, as at the outset of operation. In the opposite case, when switching over from the cold water pump to the hot water pump, a similar procedure is carried out, but in the opposite sense, in order to return the cold water in the mold to the cold water bucket while the hot water pump is actuated. Thus, the operator will ensure that the lever arm 180 is rotated only enough away from the cold water switch 206 so as to ensure the elbow 230 is over the cold water bucket, and will then manually depress the hot water switch to actuate the hot water pump for a few seconds to pump the cold water remaining in the mold back to the cold water bucket, after which, he will rotate the lever arm the full 60 degrees against the hot water switch 204, which simultaneously positions the elbow 230 over the hot water bucket, so that the return-passageway tubes deliver the circulating hot water back to its source.

While a specific embodiment of the invention has been shown and described, it is to be understood that numerous changes and modifications may be made therein without departing from the scope, spirit and intent of the invention as set forth in the appended claims.

What I claim is:

1. A method of forming an interior layer of chocolate-coating on the interior surface of an ice-cream cone, comprising:
   (a) placing melted chocolate into the interior of an ice-cream cone;
   (b) thereafter, telescopingly positioning the ice-cream cone over a mold defining an outer surface;
   (c) cooling the mold in order to cool the melted chocolate in the interior of the cone;
   (d) keeping the cone over the mold achieved by said step (b) a length of time sufficient to cool the melted chocolate in order to form an interior coating on the ice-cream cone;
   said step (b) comprising centering the cone over the outer surface of the mold, such that most of the length of the cone is spaced from the outer surface of the cone about the periphery thereof defining an annular volume in which the layer of chocolate is formed by said step (d).

2. The method according to claim 1, wherein said step of centering comprises placing the upper portion of the cone over an upper centering member of the mold, and also comprising preventing the melted chocolate from escaping out of the upper opening of the ice-cream cone by the centering member.

3. The method according to claim 2, wherein said step (c) comprises circulating cold water through into and out of the interior of the mold in order to cool the outer surface thereof.

4. An ice-cream cone having an interior chocolate-layer coating made according to the method of claim 1.

5. The method according to claim 1, further comprising:
   (e) after said step (d), warming the mold in order aid in the release of the cone from the mold; and
   (f) removing the cone from the mold after said step (e).

6. The method according to claim 5, wherein said step (e) comprises activating a pump to pump warm water from a warm-water supply to the mold; said step (c) comprising activating a pump to pump cold water from a cold-water supply to the mold; said method further comprising deactivating the cold-water pump before activating the warm-water pump.

7. The method according to claim 6, wherein each of said steps (c) and (e) comprises feeding the respective water to the same water passageways in the mold.

8. The method according to claim 7, wherein each said step of activating also comprises directing the exit mouths of the return-water passageways over the respective water supply that has been activated.

9. The method according to claim 8, wherein each said step activating and directing comprises pivoting a lever control arm having a first end and a second end, such that the first end contacts a switch for activating the respective, chosen pump, and the second end moves the return-passageways to the water supply serviced by that pump.

10. A method of forming an interior layer of chocolate-coating on the interior surface of an ice-cream cone, comprising:
    (a) placing melted chocolate into the interior of an ice-cream cone;
    (b) thereafter, telescopingly positioning the ice-cream cone over a mold defining an outer surface, the mold also having interior water passageways;
    (c) cooling the mold in order to cool the melted chocolate in the interior of the cone;
    (d) keeping the cone over the mold achieved by said step (b) a length of time sufficient to cool the melted chocolate in order to form an interior coating on the ice-cream cone;
    said step (c) comprising circulating cold water through, into and out of the water-passageways in the interior of the mold in order to cool the outer surface thereof.

11. An ice-cream cone having an interior chocolate-layer coating made according to the method of claim 10.

12. The method according to claim 10, further comprising:
(e) after said step (d), warming the mold in order to aid in the release of the cone from the mold; and
(f) removing the cone from the mold after said step (e).

13. The method according to claim 12, wherein said step (e) comprises activating a pump to pump warm water from a warm-water supply to the mold; said step (c) comprising activating a pump to pump cold water from a cold-water supply to the mold; said method further comprising deactivating said cold-water pump before activating said warm water pump.

14. The method according to claim 13, wherein each of said steps (c) and (e) comprises alternatively feeding the respective water to the same water passageways in the mold.

15. The method according to claim 14, wherein each said step of activating also comprises directing the exit mouths of return-water conduits over the respective water supply that has been activated.

16. The method according to claim 15, wherein each said step of activating and directing comprises pivoting a lever control arm having a first end and a second end, such that the first end contacts a switch for activating the respective, chosen pump, and the second end moves the return-conduits to the water supply serviced by that pump.

17. The method according to claim 12, wherein each said step (c) and (e) comprises passing the water through an inlet-conduit, and thereafter through a Y-tube connection coupling together the inlet-conduits used in said steps (c) and (e), and thereafter passing the water to a water-feed conduit coupled to the Y-tube connection into the mold.

18. The apparatus according to claim 16, further comprising biassing the lever arm in a direction such that the first end of the lever arm contacts the switch so that the cold water supply is normally actuated.